July 4, 1933.  C. DE MOOS  1,916,919
AUTOMATIC SYNCHRONIZING MECHANISM FOR FILM PRINTING MACHINES
Filed Feb. 9, 1931  3 Sheets-Sheet 1
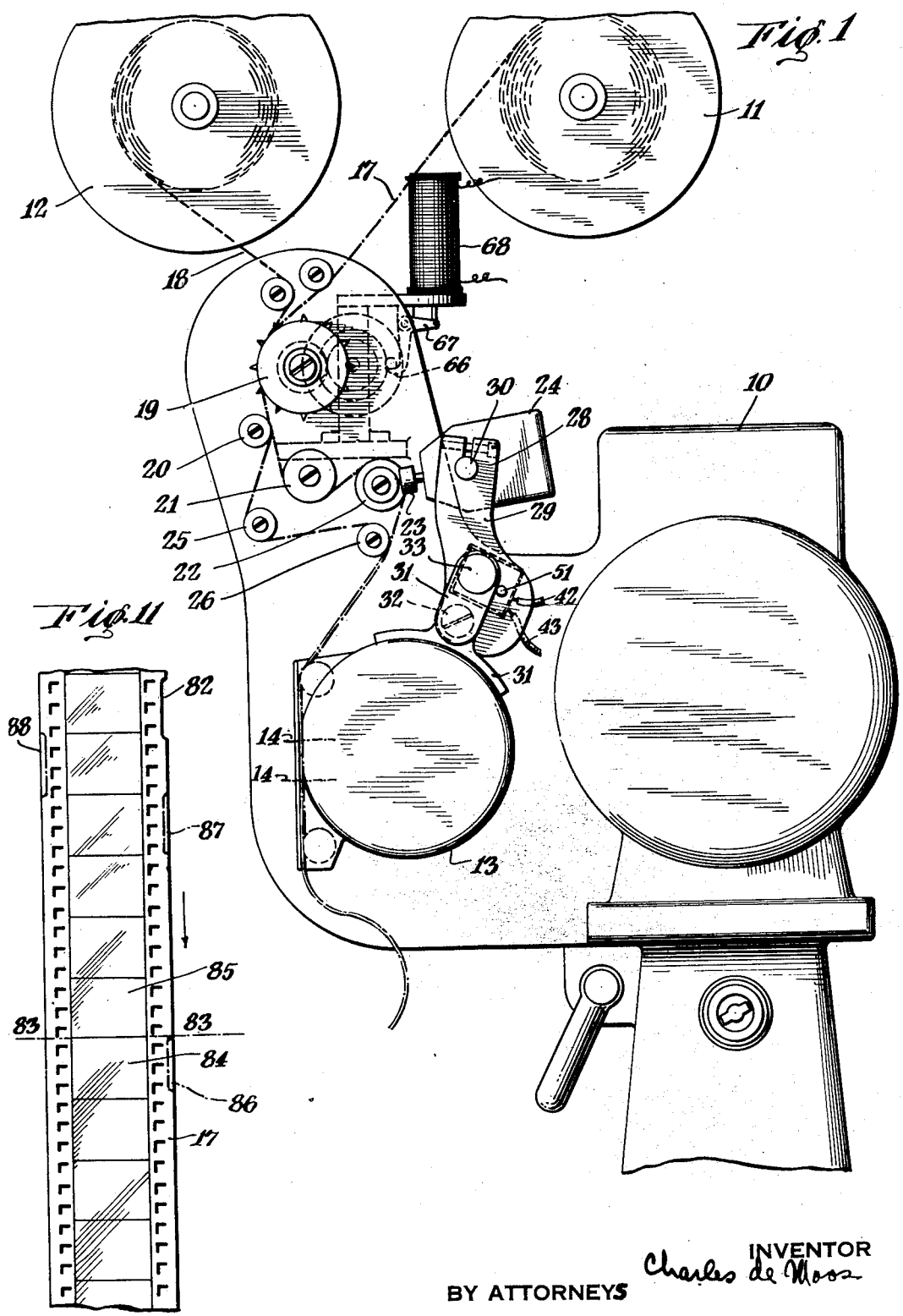
INVENTOR
Charles de Moos
BY ATTORNEYS
Huguet & Meary

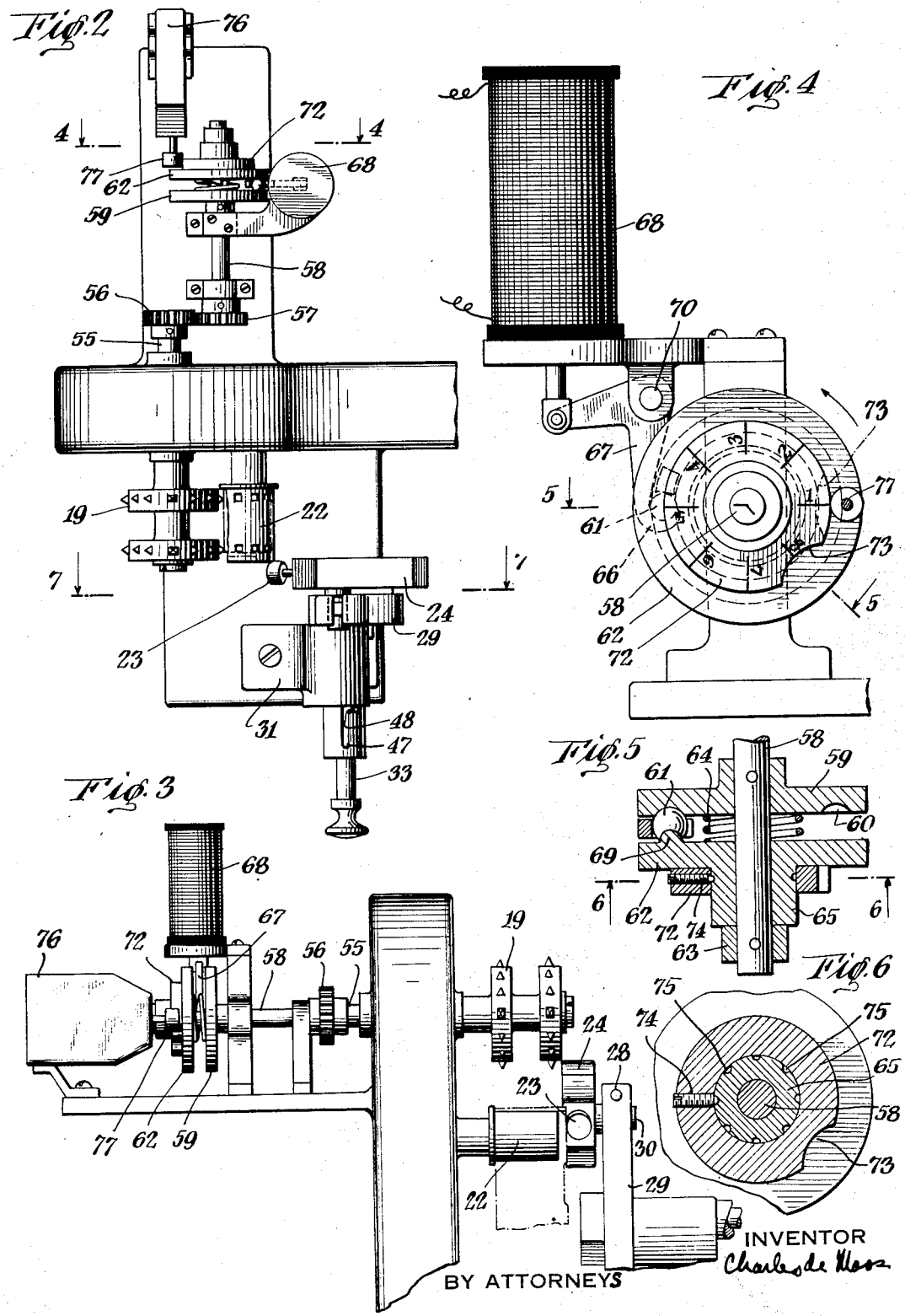

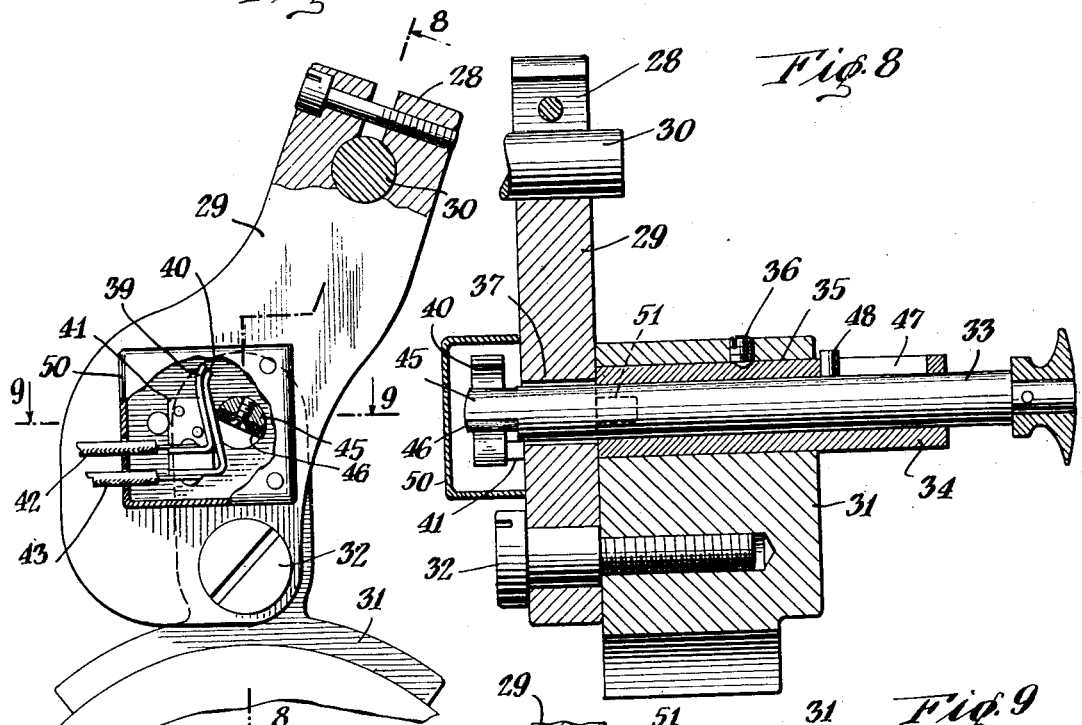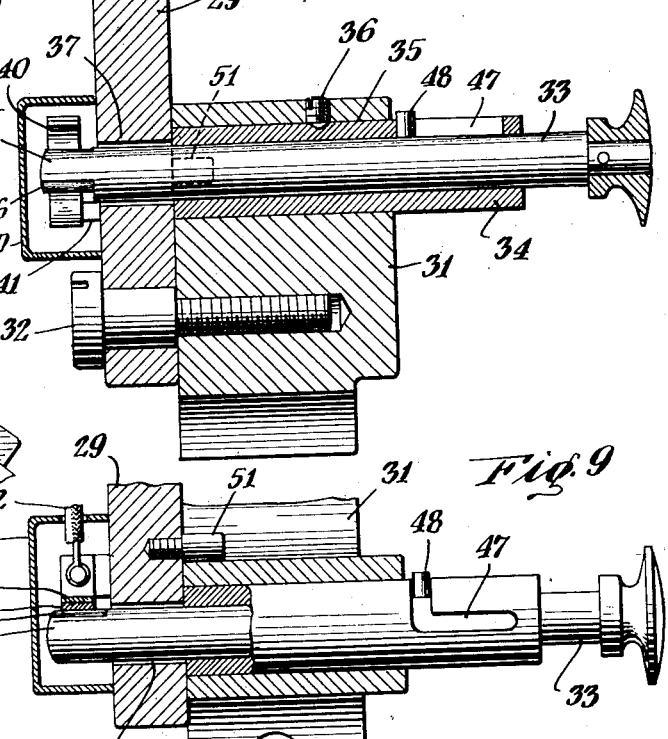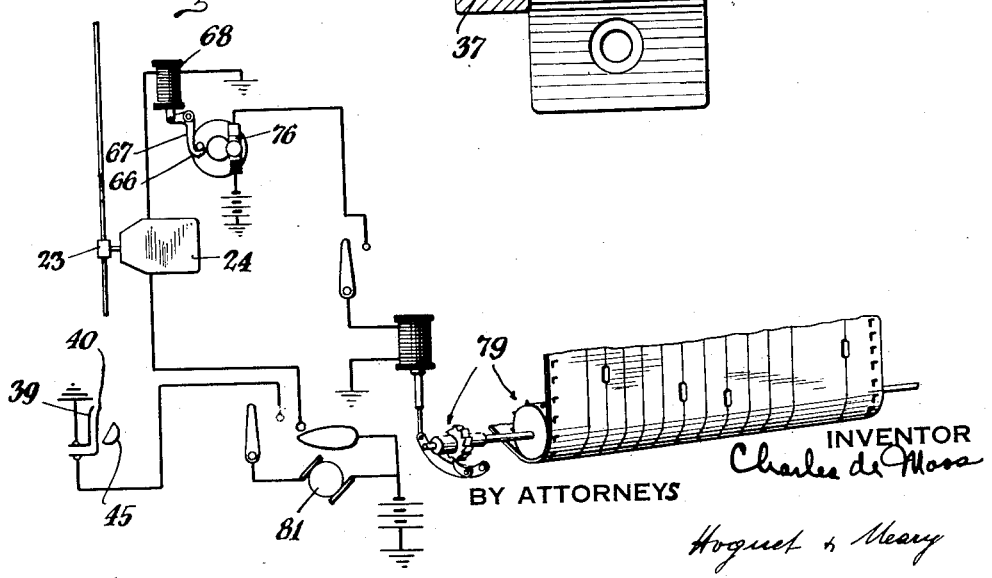

Patented July 4, 1933

1,916,919

UNITED STATES PATENT OFFICE

CHARLES DE MOOS, OF FORT LEE, NEW JERSEY, ASSIGNOR TO PATHE EXCHANGE, INC., OF BOUND BROOK, NEW JERSEY, A CORPORATION OF NEW YORK

AUTOMATIC SYNCHRONIZING MECHANISM FOR FILM PRINTING MACHINES

Application filed February 9, 1931. Serial No. 514,414.

This invention pertains generally to film printing apparatus and particularly to film printing apparatus in which the intensity of the printing light is automatically controlled.

It is well known that a negative film varies in density with each scene. This is true of the sound track as well as of the picture portion in view of the fact that the conditions upon which the average density of each depends change with the scenes. When positive films are printed from a negative film it is customary to vary the intensity of the printing light with each scene in order to obtain as nearly as possible positive films of uniform density.

The variations in the intensity of the printing light are brought about automatically. The control mechanism for this purpose generally comprises a notch in one edge of the negative film and a switch member adapted to resiliently engage the edge of the film so as to close the switch when the member moves into the notch. The notch is generally placed opposite one of the pictures on the film at or near the beginning of each scene. But the practice in this respect is not uniform. Different printing machines require the notch to be placed opposite different pictures. A film coming to a laboratory to be printed may have the notch opposite the first or second picture in advance of the scene or opposite a picture of the scene beginning with the first up to about the eighth picture. I is, of course, undersood that the change in intensity of printing light should actually occur immediately at the beginning of the printing of each scene. If this is not the case the first one or more pictures of each scene on the positive film or the last one or more pictures of each scene will be of improper density.

It can be readily seen that a negative film notched, for instance, opposite the fourth picture from the beginning of each scene, thus adapting it for one type of printing machine, cannot be used with a machine of a different type requiring the notch to be, for instance, opposite the second picture from the beginning of each scene. In order to use the negative film in question with the latter machine it has been necessary heretofore to cover up the original notches and place a notch opposite the second picture from the beginning of each scene. This procedure is highly unsatisfactory in view of the large amount of time involved in making these changes, and the unsatisfactory character of the film at the points where notches have been covered. Furthermore excessive notching weakens the negative film.

In order to overcome these difficulties I provide a printing machine which is adapted to print positive films from negative films and to automatically change the light intensity immediately upon the printing of the first picture of each scene regardless of the position of the notches previously placed in the edge of the negative film for this purpose. I also provide novel apparatus for preventing the machine from being operated except when all of the parts are in proper position.

In the drawings wherein like reference characters are appended to like parts throughout the various figures, Figure 1 is an elevation illustrating my invention applied to a printing machine.

Figure 2 is a top plan view of the same.

Figure 3 is an end elevation from left to right of Figure 1.

Figure 4 is a section on line 4—4 of Figure 2.

Figure 5 is a section on line 5—5 of Figure 4.

Figure 6 is a section on line 6—6 of Figure 5.

Figure 7 is a view taken on line 7—7 of Figure 2.

Figure 8 is a section on line 8—8 of Figure 7.

Figure 9 is a section on line 9—9 of Figure 7.

Figure 10 is a diagrammatic illustration of the electrical circuit.

Figure 11 is an elevation of a strip of negative film.

At 10 is conventionally shown a film printing machine having a reel 11 for a negative film, reel 12 for a positive film, a shutter housing 13, and a shutter diagrammatically illustrated as positioned between lines 14, 14. My device being adapted for use with any type of film printing machine, the parts described are merely illustrative in character.

The negative film 17 and the positive film 18 are superimposed and fed over a sprocket wheel 19 and are separated after passing over flanged roller 20. The negative film is illustrated as passing around flanged roller 21 and roller 22, the latter having an inner flange only, thus exposing the outer edge of negative film 17 so that it may be contacted by roller 23 on switch member 24.

The positive film 18 is illustrated as passing around flanged roller 25 and as re-contacting negative film 17 at flanged roller 26, from which point the negative and positive films pass together in contacting relationship past the printing shutter illustrated generally by lines 14, 14. It is, of course, understood that the negative and positive films are separately wound up on reels after the positive film is printed. Apparatus for this purpose is a part of the printing machine and is not illustrated, it forming no part of this invention.

The switch element 24 may be of any standard construction. It is merely necessary to state that the roller 23 is pressed against the edge of negative film 17 and that the switch is closed when the roller 23 enters a notch on the negative film. The switch is, of course, held open when the roller 23 is traveling along the un-notched portion of negative film 17. The switch element 24 is shown mounted in the bifurcated end 28 of arm 29 by means of stud 30. Arm 29 is pivotally mounted upon a bracket 31 by means of a shouldered screw shown at 32. Bracket 31 is secured to the frame of machine 10.

Arm 29 is held in position for operation of switch 24 by a pin 33 which passes through a tubular member 34. Tubular member 34 is secured in a bore 35 extending transversely through bracket 31 by any suitable means such as a set screw 36. Pin 33 passes through an aperture 37 in arm 29 to hold the arm 29 in an immovable position.

Mounted on one face of arm 29 is a block 41 carrying switch elements 39 and 40 which are insulated from each other and are normally spaced apart. The switch elements 39 and 40 are adapted to separate when released, thus opening a circuit through wires 42 and 43. The circuit through wires 42 and 43 is closed by means of a cam surface 45 on the end of pin 33. This cam surface can be readily formed by merely cutting away one side of the end of pin 33 as illustrated. A block of insulating material shown at 46 may be provided, if desired.

Tubular member 34 is provided with a bayonet slot 47 in which operates pin 48 on pin 33. The arrangement is such that the slot 47 and pin 48 permit the end of pin 33 to be withdrawn from aperture 37 in arm 29 so that the arm 29 may be moved pivotally about screw 32. This permits the switch 24 to be moved away from the edge of negative film 17 to permit the film to be changed. When pin 48 is in locking position in slot 47 cam 45 presses switch element 40 into engagement with switch element 39 to close a circuit through conductors 42 and 43 as illustrated in Figure 7. A casing 50 may be provided around the switch elements 39 and 40 and the cam 45, if desired. A stud 51 may be provided on arm 29 which acts as a stop by engaging the bracket 31 to position the aperture 37 for entry of the pin 33.

For the purpose of illustration, let it be assumed that when the first picture of a scene is fully in front of the shutter illustrated by lines 14, 14, the seventh picture of that scene is directly opposite the roller 23 of switch 24. This number is merely taken for the purpose of illustration and roller 23 may be placed at any desired distance from the shutter without departing from the spirit of the invention. Let us assume that the conventional notch is positioned opposite the last picture of each preceding scene. Each change in light intensity should then commence with the first picture after each notch. With a negative film of this character passing through applicant's device as described, the change in light intensity should occur at the end of a time interval after the switch 24 is operated equal to the passage of seven pictures past the shutter. In other words, it requires a movement forward of the film equivalent to the length of six pictures to place the picture opposite the notch in front of the shutter after the notch has been engaged by the roller 23. When the notch is opposite the last picture of each preceding scene the change in light intensity should be delayed an additional time interval equivalent to the passing of one additional picture before the shutter making seven in all. This will place the first picture of each succeeding scene before the shutter at the time the change in light intensity takes place.

If the notch is opposite the first picture of each scene the time interval between the operation of switch 24 and the change in light intensity should be equal to the time required for six pictures to pass before the shutter. If the notch is opposite the second picture of each scene, the time interval between the operation of switch 24 and the change of light intensity should be equal to the time required for five pictures to pass before the shutter. If the notch is opposite the third picture of each scene the time interval should be equal to that of the passing of four pictures. If the notch is opposite the fourth picture of each scene, the time interval should be equal to that of the passing of three pictures. If the notch is opposite the fifth picture of each scene the time interval should be that required for the passing of two pictures. If the notch is opposite the sixth picture of each scene the time interval should be that required for the passing of one picture.

If the switch 24 is spaced further from the light aperture it is, of course, possible to accommodate the machine for notches opposite pictures farther from the beginning of each scene.

To cause the change in light intensity to take place at the proper time interval after the switch 24 is operated I provide the mechanism shown in Figures 2 to 6 inclusive. Shaft 55 upon which sprocket 19 is mounted, has an extension upon which is mounted a gear 56 which meshes with a gear 57 on shaft 58. Secured to shaft 58 is a disc 59 having in one face a circumferential groove 60 comprising a race for a ball 61. Ball 61 is held in place in groove 60 by means of a disc 62 mounted loosely upon shaft 58. A collar 63 secured to shaft 58 limits the movement of disc 62 away from disc 59 and a spring 64 on shaft 58 presses the disc 62 outwardly against the collar 63. The arrangement is such that the hub 65 on disc 62 presses against collar 63 with sufficient force due to the action of spring 64 so that unless disc 62 is positively held from rotating, the disc 62 will follow exactly the movement of shaft 58.

A finger 66 on the end of bell-crank 67 which is operated by a solenoid 68 is adapted to move between discs 59 and 62 so as to hold ball 61 from rotating about shaft 58. A projection 69 on the inner face of disc 62 is positioned so that disc 62 is prevented from rotating with the shaft 58 when the ball 61 is held in position by finger 66. Finger 66 is removed from the path of ball 61 upon the operation of solenoid 68 which turns bell-crank 69 about its pivot 70. When the current through the solenoid 68 is broken, finger 66 returns to its original position to hold ball 61, thus preventing further movement of the disc 62 as soon as projection 69 engages ball 61. Mounted upon hub 65 is a cam 72 having a low point or notch 73. Cam 72 is adjustable about the hub 65 and is shown secured in position by means of a screw 74 adapted to engage a plurality of depressions 75. The gear ratio between the cam 72 and the film sprocket 19 is such that cam 72 will rotate through an angle equal to the angle defined by radial lines passing through two adjacent notches 75, each time the film moves forward the length of one picture, provided disc 62 is free to move.

Switch 76 is mounted so that its roller 77 engages the surface of cam 72 and is adapted to close an electrical circuit when the roller 77 passes into notch 73. Switch 76 controls a circuit through a device which is adapted to automatically change the light intensity to that required for each succeeding scene. The latter devices are well known and do not comprise a part of this invention. It is merely necessary to state that such devices are provided with the proper switch elements for each film to be printed so that the proper light for each succeeding scene is obtained merely by closing the switch 76 once for that scene. Apparatus of this general nature is shown diagrammatically at 79 in Figure 10. The problem which applicant solves is that of having the light change made at the proper time so that the first picture of each scene is printed with light of the proper intensity.

The operation of the device is as follows: The negative and positive films are placed upon their proper reels and are threaded through the machine over the proper sprockets and rollers. They are then secured to their respective take-up reels. To place the negative film in position requires switch 24 to be swung out of place. This is accomplished by releasing pin 33 and moving the same out of aperture 37 in bracket 29. Turning of the pin 33 to release the same breaks the electrical circuit through switch elements 39 and 40. Switch elements 39 and 40 are in the motor circuit of the printing machine 10, the motor being illustrated diagrammatically at 81 in Figure 10. It is therefore necessary to replace the switch 24 so as to bring the roller 23 against the side of negative film 17 and to turn the pin 33 into locking position so as to close the circuit between switch elements 39 and 40 before the machine can be started.

This feature is very important particularly in view of the fact that printing takes place in a dark room. By this novel arrangement it is impossible to start the machine without the switch 24 being in place, thus insuring that the changes in light intensity will be properly synchronized with the negative film.

Let it be supposed that the notches in the negative film are opposite the sixth picture from the beginning of each new scene. Such a notch is illustrated at 82 in Figure 11, the dividing line between the preceding and succeeding scenes being illustrated at 83. The notch 82 will reach roller 23 to close the circuit through switch 24 when picture 84 is before the shutter. A delay equal to the time required for the movement forward of one picture is required to bring picture 85, which is the first picture of the succeeding scene, in front of the shutter before the light change is made. To accomplish this, cam 72 is placed in the position shown in Figures 4 and 6. It will be recalled that the switch 76 closes the circuit which effects the light change. The time interval between the operations of switches 24 and 76 should be equal to the time required for the movement forward of one picture. Cam 72 when free is synchronized with sprocket 19 and solenoid 68 is in circuit with switch 24. The closing of switch 24 releases finger 66, permitting cam 72 to travel with shaft 58. Cam 72 turns counter clockwise as seen in Figure 4 and notch 73 will reach the dotted line position so as to operate switch 76 after the proper time interval.

To adapt the device for any other position of the notches in the edge of the negative film it is merely necessary to adjust the cam 72 on hub 65 so as to provide for the proper time interval between the operation of switch 24 and switch 76. This time interval will, of course, depend upon the position of the notch in the edge of the negative film. The cam is shown graduated to provide for from one to seven picture intervals. Of course any other number of intervals may be provided for.

I have illustrated in dotted lines at 86 a notch opposite the last picture of the preceding scene and in dotted lines at 87 a notch opposite the fourth picture of the scene undergoing printing. The notch may, of course, be opposite any picture.

It is possible to adapt the device for operation with notches on either side of the film. This may be accomplished by installing two switches 24, one on each side of the negative film, and permitting the desired switch to operate, or stud 30 may be lengthened, roller 22 reversed, and switch 24 positioned by shifting for operation at either edge of film 17. I have illustrated, for instance, in dotted lines, a notch at 88 opposite the fifth picture but on the opposite side of the film from the other notches.

The invention is equally applicable to the printing of pictures and sound tracks, as well as for any other type of printing.

While I have described the invention in connection with a negative film having notches along its edges, it is, of course, understood that the invention is in no way limited thereto and that any other device may be employed for the operation of the circuit of switch 24, said device being attached or functioning in some way with the film 17.

The invention has been described in connection with apparatus shown in detail. However, it is understood that it is in no way limited thereto.

Having described my invention it is obvious that many modifications may be made in the same within the scope of the claims without departing from the spirit thereof.

I claim:

1. In a device of the kind described, means for printing a positive film from a negative film, said negative film having successive portions of different average densities, a printing light, means for successively varying the intensity of said printing light, means for synchronizing said variations in printing light with said variations in average density, said last mentioned means comprising control means on said film, control means for said light varying means, and means actuated by said film control means adapted to in turn actuate said light control means after a predetermined time interval, said time interval being adjustable as required by the position of said control means on said film.

2. In a device of the kind described, means for printing a positive film from a negative film, said negative film having successive portions of different average densities, a printing light, means for successively varying the intensity of the printing light, means for synchronizing said variations in printing light with said variations in average density, said last mentioned means comprising control means on said film, control means for said light varying means, means actuated by said film control means adapted to in turn actuate said light control means after a time interval, and means for regulating said time interval.

3. In a device of the kind described, means for printing a positive film from a negative film, means for moving said films through said last mentioned means, control means associated with and contacting said negative film, printing light means, said control means controlling said printing light means, a pivotally mounted arm, said control means mounted on said arm, a switch in circuit with said control means mounted on said arm, and means for locking said arm to hold said control means in operative position, said locking means adapted to simultaneously close said switch.

4. In a device of the kind described, means for printing a positive film from a negative film, said negative film having successive portions of different average densities, a printing light, means associated with said film adapted to close a circuit at predetermined points on said film, and means controlled by said circuit adapted to close a second circuit after an adjustable time interval to control the intensity of said printing light.

5. In a device of the kind described, means for printing a positive film from a negative film, said negative film having successive portions of different average densities, a printing light, control means on said negative film, printing light varying means, and means actuated by said film control means adapted to in turn actuate said printing light varying means after an adjustable time interval.

6. In a device of the kind described, means for printing a positive film from a negative film, said negative film having successive portions of different average densities, a printing light, control means on said negative film, printing light varying means, means actuated by said film control means adapted to in turn actuate said printing light varying means after a predetermined time interval, and means for regulating said time interval.

7. In a device of the kind described, means for printing a positive film from a negative film, said negative film having successive portions of different average densities, a printing light, means associated with said negative film adapted to close a circuit at predetermined points on said negative film, and means controlled by said circuit adapted to close a second circuit after a predetermined time interval said last mentioned means comprising a frictionally driven cam, a switch adapted to be operated by said cam, means for holding the switch operating portion of said cam at predetermined angular distances from the cam engaging element of said switch, said first mentioned circuit operating to release said last mentioned means at desired intervals corresponding to said predetermined points on said film to permit operation of said cam, and closing of said second circuit.

8. In a device of the kind described, means for printing a positive film from a negative film, means for moving said film through said last mentioned means including an electrical circuit, control means associated with said negative film, a pivotally mounted arm, said control means mounted on said arm and adapted to be moved in and out of operative positions by movement of said arm, a switch mounted on said arm, said switch being in said circuit, and means for locking and unlocking said arm when said control means is in operative position, said last mentioned means adapted to simultaneously close and open said switch so that said film moving means will operate only when said control means is locked in operative position.

9. The combination with a printing machine adapted to print a positive film from a negative film and having a shutter, a printing light, and printing light control means, of means for actuating said printing light control means, said last mentioned means adapted to be actuated when a predetermined point on said negative film reaches a point spaced a predetermined distance from said shutter and having means for adjusting the time of response of said printing light control means relative to the time when said first mentioned point reaches said second mentioned point.

10. The combination with a printing machine adapted to print a positive film from a negative film and having a printing light and means for varying the intensity of said printing light, of means associated with said negative film adapted to close a circuit at a predetermined point on said negative film as it passes through said printing machine, and means controlled by said first mentioned circuit adapted to close a second circuit, said second circuit adapted to actuate said light intensity varying means, and means associated with said first mentioned circuit for adjusting the time of closing of said second circuit with respect to the time of closing of said first circuit.

11. The combination with a printing machine adapted to print a positive film from a negative film and having a printing light and means for varying the intensity of said printing light, of means associated with said negative film adapted to be actuated by said negative film when a predetermined point on said negative film passes a predetermined point on said printing machine, said last mentioned means adapted in turn to actuate said light intensity varying means, and means for adjusting the time of response of said light intensity varying means with respect to the time of actuation of said second mentioned means.

In testimony whereof, I have signed my name to this specification this 27th day of January 1931.

CHARLES DE MOOS.